united States Patent
Erbert

[15] 3,691,461
[45] Sept. 12, 1972

[54] ELECTROMAGNETIC DEVICE
[72] Inventor: Virgil Erbert, Albuquerque, N. Mex.
[73] Assignee: Rolamite, Incorporated, San Francisco, Calif.
[22] Filed: Oct. 29, 1970
[21] Appl. No.: 84,985

[52] U.S. Cl.............................324/151 R, 324/132
[51] Int. Cl..........................G01r 1/16, G01r 15/10
[58] Field of Search......324/151 R, 151 A, 144, 146, 324/150, 154, 155, 132; 335/222; 310/12, 15

[56] References Cited

UNITED STATES PATENTS 3,161,793  12/1964  Laithwaite...............310/15 X
3,479,596  11/1969  Carlson et al..............324/151

FOREIGN PATENTS OR APPLICATIONS 1,102,273  3/1961  Germany...................324/132

Primary Examiner—Alfred E. Smith
Attorney—Burns, Doane, Swecker & Mathis

[57] ABSTRACT

An electromagnetic device in which a coil is mounted in a magnetic field for movement in proportion to the electrical current flowing in the coil. The magnetic air gap is divided into two sections with separated centers and the coil is supported for swinging movement in both arcuate sections of the magnetic field. The linkages supporting the coil are selected so that a pointer attached to the coil moves along a straight line at a predetermined distance from the coil. The coil is continuous between the two sections of the magnetic field and the resultant force due to current in the coil causes the coil to swing the pointer along a straight path a distance proportional to the current in the coil.

12 Claims, 7 Drawing Figures

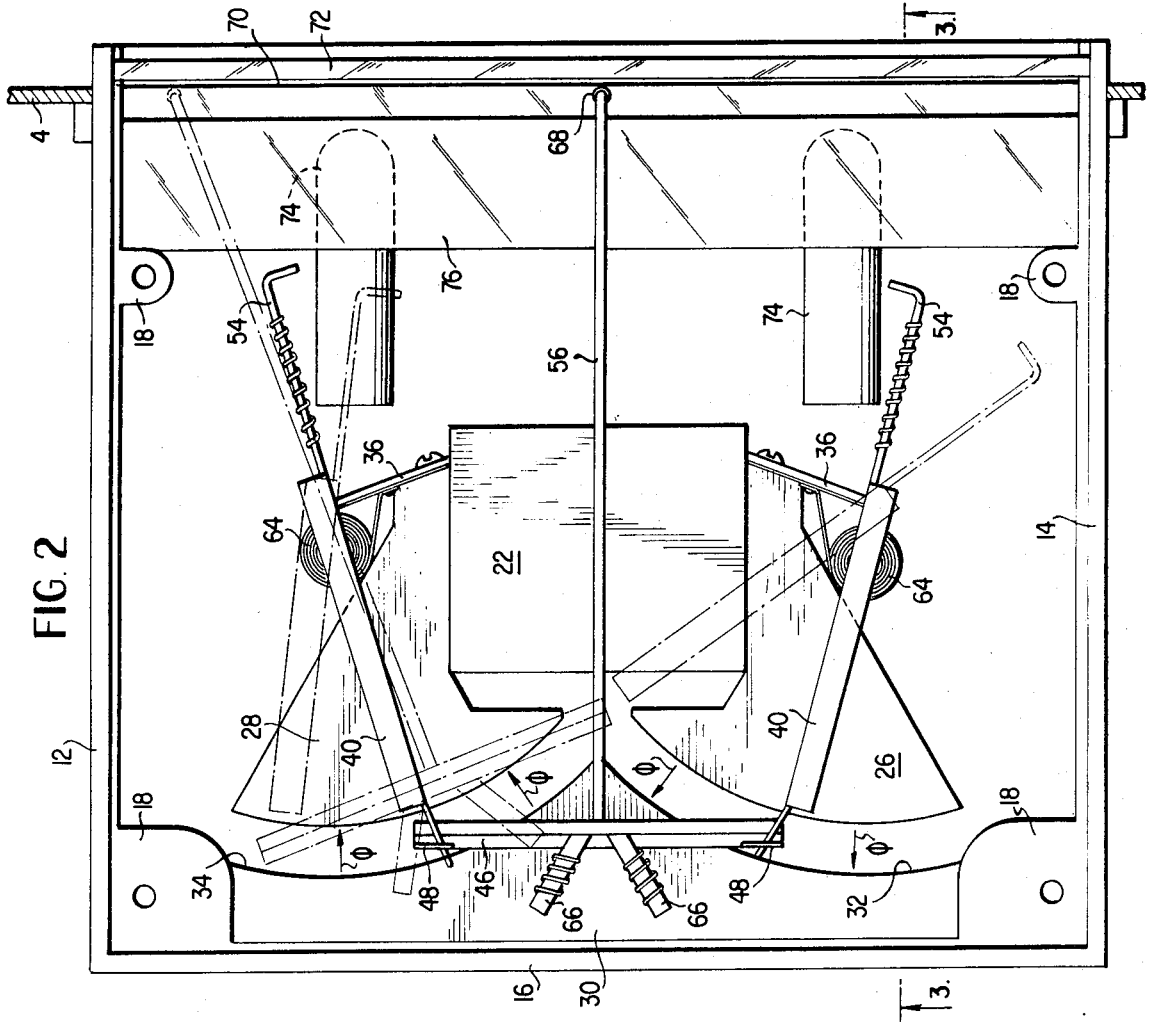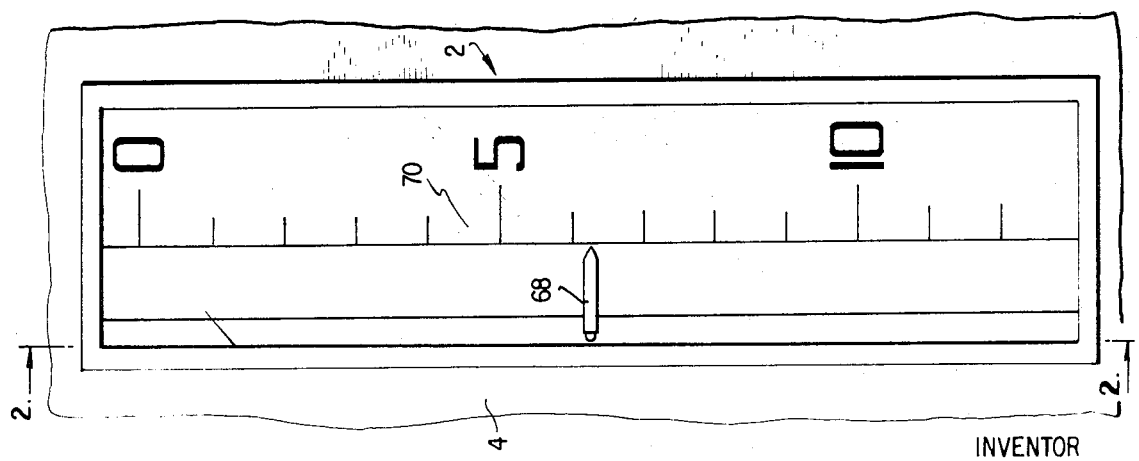
INVENTOR
VIRGIL ERBERT
BY Burns, Doane, Swecker & Mathis
ATTORNEYS

PATENTED SEP 12 1972　　　　　　　　　　　　　3,691,461

ELECTROMAGNETIC DEVICE

BACKGROUND OF THE INVENTION

This invention relates to electromagnetic devices, and more particularly to devices in which an electric coil is mounted in a magnetic field for swinging movement in proportion to the current flowing in the coil.

The D'Arsonval galvanometer is an example of a device in which a coil is mounted in a magnetic field. When electric current is flowing in the coil wire, torque is applied to the coil tending to rotate it about an axis perpendicular to the direction of flux in the magnetic field. The magnitude of the torque produced is proportional to the current in the coil wire. Such devices are commonly used in measuring instruments, such as ammeters, voltmeters and ohmmeters. The D'Arsonval galvanometer has been improved by arranging the coil for rotary movement on pivot bearings and to provide a restoring torque on the coil by means of a spiral spring. The coil is mounted on a core between magnetic pole pieces. The coil rotates relative to the pole pieces about the bearing axis and a pointer extending outwardly from the coil swings across a scale a distance that is proportional to the torque produced by the current flowing in the coil. The pointer which extends perpendicular to the axis of rotation of the coil moves in a circular arc.

For some applications, it is desirable for the pointer to move along a straight line, rather than a circular arc. For example, in edge-mounted meters on instrument panels, the pivot axis of the coil is mounted parallel to the surface of the panel and the pointer is bent at right angles across a scale which extends usually vertically or horizontally across the face of the panel. Typically, the scale and the cover glass for the meter curve outwardly from the surface of the panel to accommodate for the swinging motion of the pointer. The curvature of the scale and cover glass can be minimized by placing the meter movement at a substantial distance behind the surface of the panel so that the arc of movement of the pointer approaches a straight line. One disadvantage of this arrangement is that the meter housing projects a substantial distance behind the panel and requires more space than may be available. Also, the required scale curvature causes the instrument to extend a considerable distance outward from the panel surface.

Another disadvantage of conventional edge meters is that the curvature of the scale causes parallax. Depending upon the position of the observer and the curvature of the scale, considerable error may occur in reading indicated values particularly at the upper and lower regions of the scale. Furthermore, the curved cover glass produces glare from practically any angle of view.

SUMMARY OF THE INVENTION

In view of the disadvantages of conventional meter movements, it is an object of this invention to provide an improved meter movement.

Another object of this invention is to provide a meter movement in which the pointer moves along a substantially straight line in response to current flowing in the coil.

It is also an object of this invention to provide a meter movement in which the indicator moves a distance that is proportional to the current in the coil.

A further object of this invention is to provide a meter movement which projects behind or in front of the instrument panel a minimum distance when mounted as an edge meter.

A still further object of this invention is to provide a meter movement that is sensitive, and yet resistant to damage by shock and vibration.

These objects are accomplished in accordance with a preferred embodiment of the invention by a meter movement in which the coil is mounted between a pair of arms for swinging movement through two nonconcentric circular intersecting air gaps between magnetic pole pieces. A pointer projects outwardly from the coil and the indicator end of the pointer moves along a straight line due to the geometrical relationship of the arms and the coil.

DESCRIPTION OF THE DRAWINGS

This preferred embodiment of the invention is illustrated in the accompanying drawings in which:

FIG. 1 is a front elevational view of a meter in accordance with this invention shown as mounted in an instrument panel;

FIG. 2 is an enlarged cross sectional view of the meter along the line 2—2 in FIG. 1;

DESCRIPTION OF PREFERRED EMBODIMENT

Figure 3:
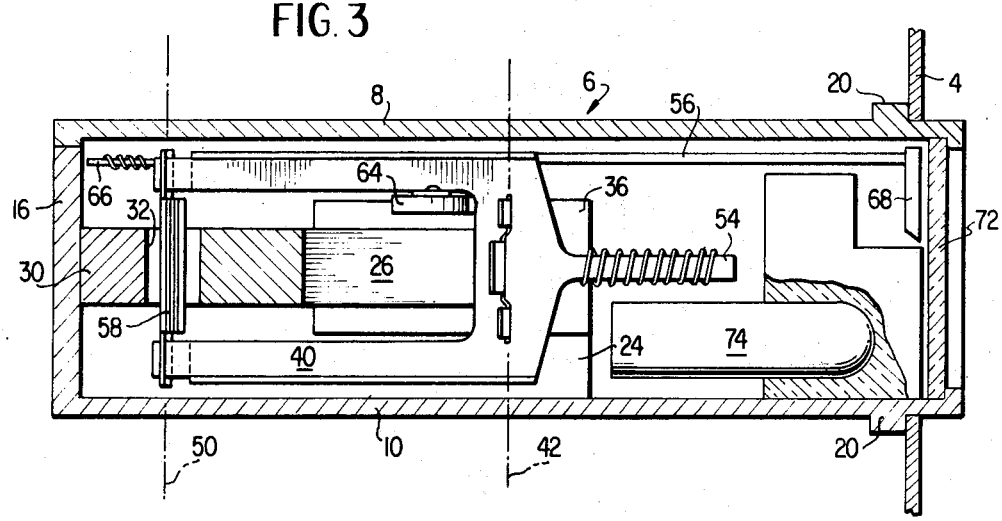
FIG. 3 is a cross sectional view of the meter along the line 3—3 in FIG. 2.

The electromagnetic device of this invention is illustrated in FIGS. 1 to 4 as embodied in an edge meter 2. The edge meter is mounted in an instrument panel indicated schematically at 4.

The edge meter 2 includes a housing 6 having side walls 8 and 10, end walls 12 and 14 and a rear wall 16. The side wall 8 forms a cover for the housing 6 and is secured in place by screws which engage tapped holes in bosses 18 formed in the housing (FIG. 2). A flange 20 extends around the perimeter of the housing and abuts against the rear side of the panel 4. The housing may be supported in this position by any suitable conventional means.

In the interior of the housing 6, a permanent magnet 22 is mounted on a support 24 and is positioned approximately midway of the thickness of the housing 6, so that space is provided between the upper and lower surfaces of the magnet 22 and the interior of the walls 8 and 10, as shown in FIG. 3. Pole pieces 26 and 28 are secured on the permanent magnet 22. An auxiliary pole piece 30 is secured on the rear wall 16 of the housing in alignment with the pole pieces 26 and 28. The pole pieces are arranged to fine arcuate air gaps 32 and 34 which intersect approximately midway of the length of the auxiliary pole piece 30.

Mounting tabs 36 are secured on the pole pieces 26 and 28 by screw fasteners 38. Pivot arms 40 are hingedly supported on the tabs 36 for swinging about axes 42 and 44 which are located at the center of curvature of the air gaps 32 and 34, respectively. The hinge connection between the tabs 36 and the pivot arms 40 should be such that there is minimum frictional drag to resist swinging of the pivot arms 40. It is preferred that this pivotal connection be made in accordance with the teachings of my U.S. Pat. No. 3,618,562, issued Nov. 9, 1971, entitled Pivotal Mounting.

The ends of the pivot arms 40 each support a rectangular frame 46. The frame 46 includes a plurality of flanges 48 which are slotted to receive the ends of the arms 40, providing a pivotal connection for swinging each end of the frame 46 about an axis 50 and an axis 52 which are parallel to and equally spaced from the axes 42 and 44, respectively. The frame 46 is preferably formed of an electrical and magnetic insulating material, except that the flanges 48 are preferably electrically conductive to conduct current to the coil that is wound on the frame. Alternatively, the coil and its insulation may be made sufficiently rigid to allow the separate frame 46 to be omitted. In this alternative form, the flanges 48 are secured directly to the coil insulation at the same locations as in FIG. 4.

As shown in FIGS. 2 and 3, the arms 40 position the frame 46 in the respective air gaps 32 and 34. The distance between the pivot axes 42 and 50 of one arm 40 is substantially equal to the distance separating the pivot axes 44 and 50 of the other arm 40. The pivot arms 40 include counterbalancing extensions 54 which may be wrapped with wire to counterbalance the weight of the frame about the pivot axes 42 and 44. A pointer shaft 56 is secured at one end on the frame 46 midway between the pivot axes 50 and 52. As shown in FIG. 2, the pivot shaft 56 extends perpendicular to the plane defined by the axes 50 and 52.

Figure 7:
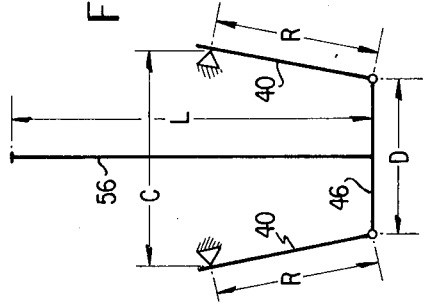
FIG. 7 is a schematic plan view of the linkage system of this invention.

The arms 40 swing relative to the pole pieces 26 from the position shown in phantom lines in FIG. 2, through the position shown in full lines in FIG. 2, to the position in which the axis 50 is located near the open end of the air gap 32. The length of the pointer shaft 56 is selected in relation to the lengths of the pivot arms 40 and the frame 46 such that the end of the pointer shaft 56 follows a substantially straight line during swinging movement of the frame 46 through the air gaps. The geometrical relationship of the pointer shaft to the movable links to produce straight-line motion of a point on the shaft is shown schematically in FIG. 7. In the preferred embodiment, it is desirable for the end of the pointer shaft 56 to move along a straight line for a relatively long distance at a substantial distance from the arms 40 to achieve a practical design for meter instrument applications. In FIG. 7, the length of the frame 46 between the pivots is indicated by $D$; the distance between the arm pivot axes 42 and 44 is indicated by 6; the length of each arm 40 is indicated by $R$; and the length of the pointer shaft 56 between the frame 46 and the pointer 68 is indicated by $L$. In the preferred embodiment, the ratios of these lengths is as follows:

$C = 1.5 D$
$R = 1.10 D$
$L = 2.50 D$

Figure 4:
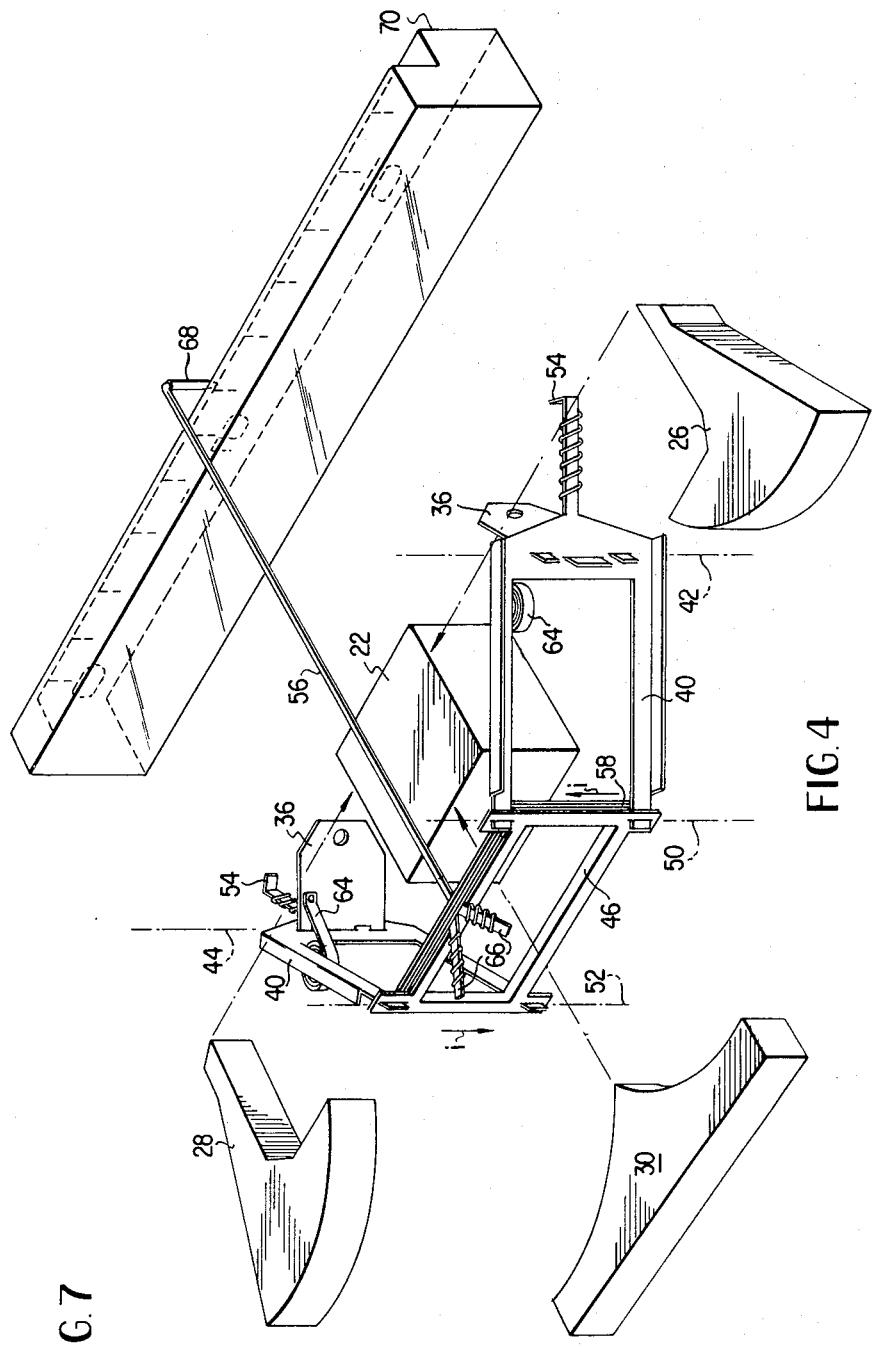
FIG. 4 is a schematic perspective view of the meter of FIGS. 1 to 3.

If desired, $L$ may be shortened for smaller meters or lengthened for larger meters without changing the other values. If $L$ is shortened, so that $L$ is less than 2.50 $D$, then the path of the pointer 68 is slightly concave with respect to the plane of the instrument panel. If $L$ is lengthened, so that $L$ is greater than 2.50 $D$, then the path of the pointer 68 is slightly convex with respect to the plane of the instrument panel. Spiral hair springs 64 are mounted on the arms 40, with one end of the spring wire secured to the tabs 36. The springs 64 provide a progressively increasing resistance to counterclockwise swinging of the arms 40 and continually urge the pointer shaft 56 to return to the position shown in phantom lines in FIG. 2. Counterbalancing extensions 66 are provided on the frame 46 to equalize the weight of the shaft 56. As shown in FIGS. 3 and 4, counterbalancing weights in the form of wires may be wrapped on the extensions 66.

An electrical conductor is wrapped around the perimeter of the frame 46 to form an electromagnetic coil 58. Opposite ends of the coil conductor are soldered or otherwise connected to flanges 48 at opposite ends. The tabs 36 are preferably electrically conductive and are insulated from the respective pole pieces 26 and 28. Each of the arms 40 is also electrically conductive, and current flows between the tabs 36 and arms 40 through the springs 64. From the arms 40, current flows through the flanges to the coil. Terminals connected with the tabs 36 are provided on the outside of the housing for connecting a source of electrical current across the coil 58. When electrical potential is applied across the opposite ends of the terminals, current flows in the coil 58 around the perimeter of the frame 46 in the same direction so that when the current in the coil conductor at one end of the frame 46 is flowing in the direction of the arrow marked $i$ in FIG. 4, the current in the coil conductor at the opposite end of the frame 46 is flowing in the opposite direction relative to the frame 46.

Referring to FIG. 2, if the pole piece 26 is connected with the north pole of the magnet 22 and the pole piece 28 is connected with the south pole, magnetic flux flows across the air gap 32 in the direction of the arrow marked $\phi$. The magnetic flux is conducted along the auxiliary pole piece 30 and flows across the air gap 34 in the direction of the arrow marked $\phi$ in FIG. 2. Assuming that the current is flowing in the coil conductor as indicated by the arrows in FIG. 4, the electromagnetic force on the conductor is in a direction tending to swing the arms 40 counterclockwise as viewed in FIG. 2 and to displace the shaft 58 downwardly relative to the housing.

The outer end of the pointer shaft 56 is provided with a pointer 58 which extends into close proximity with the edge of the meter scale 70. By properly selecting the length of the linkages and the pointer shaft, the pointer 68 not only moves along a straight line, but also moves in substantially equal increments in proportion to equal increments of change of the current in the conductor 60. Thus, the scale 70 is substantially linear. A cover glass 72 is mounted in the housing 60 over the scale and since the pointer 68 and the scale 70 are substantially equally spaced from the cover glass 72, parallax error is minimal over the entire scale when read from the front.

In order to utilize the meter illustrated in FIGS. 1 to 4, the external terminals are connected to a source of electric potential. The pointer and linkages are in the positions shown in phantom lines in FIG. 2 when no current is flowing in the conductor 60. When current is applied across the terminals, the electromagnetic force causes the frame 46 to swing the arms 40 counterclockwise, displacing the pointer 68 along the scale 70 until the opposing torque of the springs 64 equals the sum of the electromagnetic force. When the circuit is opened so that current no longer flows in the coil 58, the springs 64 return the pointer shaft 56 and the pointer 68 to the position shown in phantom lines.

The scale 70 may be illuminated by lights 74 which are mounted in a clear plastic block 76. Also, the springs 64 may be arranged in opposition to each other to cause the pointer shaft 56 to seek the central position, as shown in full lines in FIG. 2. The pointer shaft 56 will then swing clockwise or counterclockwise along the scale 70, according to the direction of flow of current in the coil 58.

Figure 5:
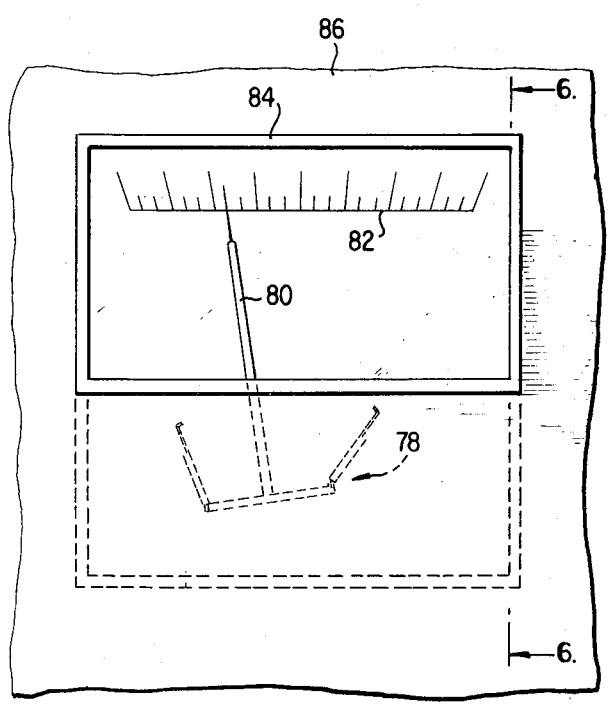
FIG. 5 is a front elevational view of a modified form of the meter in which the scale is parallel to the plane of swinging of the pointer.
Figure 6:
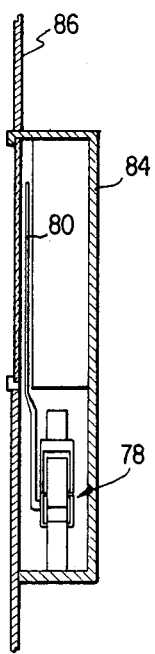
FIG. 6 is a cross sectional view of the meter along the line 6—6 in FIG. 5.

The meter movement of this invention may also be used with a face-on meter to achieve the benefits of a straight line, linear scale. A modified form of the invention is illustrated in FIGS. 5 and 6 in which the meter movement, indicated generally at 78 in FIGS. 5 and 6, corresponds to the movement illustrated in FIGS. 1 to 4. The pointer shaft 80 extends outwardly across the scale 82. The position of the base line for the scale 82 corresponds to the position on the pointer shaft 80 which traverses a straight line as the frame swings through the arcuate air gaps. The meter movement is mounted in a case 84 behind an instrument panel 86 in a conventional manner.

The edge meter of this invention, particularly the embodiment of FIGS. 1 to 4, is statically and dynamically balanced, so that shock loads do not induce swinging movement of the pointer shaft. Due to the pivotal mountings which have low frictional drag, the meter movement can be sensitive to small changes in current in the coil 58. The arrangement of the pivot arms 40 and the use of a single coil 58 provides a unit which may be manufactured inexpensively, and yet provides arcuate results. Since this meter movement occupies relatively small space behind the instrument panel, it may be used in locations where there is insufficient space for conventional edge meters. Furthermore, since the meter face is flat, it does not project outwardly from the front of the instrument panel as do conventional edge meters.

While this invention has been illustrated and described in connection with a preferred embodiment, it is recognized that variations and changes may be made therein without departing from the invention as claimed.

What is claimed is:

1. An electromagnetic device comprising:
   a. loop means for conducting electrical current around a loop with current at one side of said loop means flowing in one direction and current at the opposite side of said loop means flowing in the opposite direction,
   b. support means for swinging said one side of said loop means about a first axis and said opposite side about a second axis spaced from said first axis, said support means including a pair of arms, each of said arms being mounted for swinging about one of said axes, said loop means including hinge means hingedly connecting each of said arms with the respective sides of said loop means for swinging about hinge axes spaced apart from each other, said first and second axes being parallel to each other,
   c. a pointer shaft extending outwardly from said loop means, said shaft at a predetermined distance from said loop means following a substantially straight path while said loop means swings about said axes,
   d. magnetic means for conducting magnetic flux relative to said sides of said loop means, said flux tending to swing said sides about said first and second axes in the same direction in response to current flowing in said loop, and
   e. means yieldably opposing swinging of said loop, whereby said loop swings in proportion to the current flowing in said loop means.

2. The electromagnetic device according to claim 1 wherein said hinge axes are substantially parallel to said first and second axes and to each other, the length of one arm between said first axis and the hinge axis being substantially equal to the length of the other arm between said second axis and the other hinge axis.

3. The electromagnetic device according to claim 2 including a pointer shaft extending substantially perpendicular to a plane formed by said hinge axes from a location substantially midway between said hinge axes, said shaft at a predetermined distance from said plane following a substantially straight path while said loop means swings about said first and second axes.

4. An electromagnetic device comprising:
   a. magnetic circut means including a pair of pole pieces and an auxiliary member extending between said pole pieces, said auxiliary member and said pole pieces being spaced apart to define first and second air gaps,
   b. loop means extending through said first and second air gaps, said loop means including a conductor of electrical current arranged in a loop sequentially passing through said first air gap and through said second air gap,
   c. means conducting magnetic flux across said first air gap in a direction from one of said pole pieces to said auxiliary member and across said said second air gap in a direction from said auxiliary member to the other of said pole pieces, said conductor extending through said first and second air gaps in a direction perpendicular to said magnetic flux,
   d. means restricting said conductor to movement along said air gaps in predetermined paths, said restricting means including a pair of arms pivotally connected with the loop means at spaced apart locations substantially coinciding with said predetermined paths, each of said arms being supported for swinging movement about parallel axes, and
   e. shaft means extending outwardly from said loop means, said shaft means being perpendicular to a line interconnecting said conductor portion in said air gaps, whereby a current flowing in said conductor portions induces swinging movement of said arm means relative to said magnetic circuit means.

5. The electromagnetic device according to claim 4 wherein said locations are spaced apart from each other a distance less than the distance separating said parallel axes, and said shaft means has a length greater than the distance separating said locations.

6. The electromagnetic device according to claim 4 wherein said shaft means at a predetermined distance from said loop means moves along a substantially straight path upon swinging of said arms, and including means yieldably biasing said shaft means toward a predetermined position along said straight path.

7. An electrical meter comprising:
 a. base means having a scale mounted thereon,
 b. a pair of arms, mounting means pivotally mounting the arms on said base means for swinging about centers spaced apart from each other,
 c. frame means having pivotal connections with each of said arms,
 d. a conductor extending adjacent each of said pivotal connections and continuously around said frame means in a loop,
 e. magnetic circuit means having a pair of air gaps, said air gaps being substantially concentric with said centers, said conductor adjacent one of said pivotal connections being in one of said air gaps and said conductor adjacent the other of said pivotal connections being in the other air gap, thereby causing said frame means to swing in one direction relative to said base means in response to current flowing in said conductor, and
 f. pointer shaft extending outwardly from said frame means and cooperating with said scale to indicate movement of said pointer in proportion to current flowing in said conductor.

8. The electrical meter according to claim 7 wherein said scale is substantially straight, and said shaft means has a pointer aligned with said scale as said shaft means swings relative to said scale.

9. The electrical meter according to claim 7 wherein said frame means is substantially rectangular and has a central opening therein, said magnetic circuit means including a magnet and opposite pole pieces and also including an auxiliary member, said air gap being between said pole pieces and said auxiliary member.

10. The electrical meter according to claim 9 wherein said rectangular frame means has longitudinal sides joined together at opposite ends of transverse sides, and said conductor extends sequentially along one of said longitudinal sides, along one of said transverse sides, along the other of said longitudinal sides and along the other of said transverse sides, said pivotal connections being substantially aligned with said transverse sides.

11. The electrical meter according to claim 10 wherein said auxiliary member has a thickness that is less than the width of said opening between said longitudinal sides.

12. The electrical meter according to claim 10 wherein said arms have openings therein for receiving said pole pieces, thereby allowing said arms to swing said frame means in said air gaps, and including means for conducting current from said pivotal connections to said conductor, and spring means urging said shaft means toward a predetermined position.

* * * * *